(12) United States Patent
Sato et al.

(10) Patent No.: US 7,766,775 B2
(45) Date of Patent: Aug. 3, 2010

(54) CHAIN TENSIONER

(75) Inventors: Seiji Sato, Iwata (JP); Satoshi Kitano, Iwata (JP); Yoshiaki Ryouno, Iwata (JP); Kouichi Onimaru, Iwata (JP)

(73) Assignee: NTN Corporation, Osaka (JP)

( * ) Notice: Subject to any disclaimer, the term of this patent is extended or adjusted under 35 U.S.C. 154(b) by 87 days.

(21) Appl. No.: 11/987,479

(22) Filed: Nov. 30, 2007

(65) Prior Publication Data

US 2008/0132366 A1 Jun. 5, 2008

(30) Foreign Application Priority Data

Dec. 1, 2006 (JP) ............... 2006-325682
Dec. 1, 2006 (JP) ............... 2006-325716

(51) Int. Cl.
*F16H 7/08* (2006.01)
*F16H 7/12* (2006.01)
*F16H 7/22* (2006.01)

(52) U.S. Cl. ............... 474/138; 474/101; 474/109; 474/111

(58) Field of Classification Search .......... 474/110, 474/138, 135
See application file for complete search history.

(56) References Cited

U.S. PATENT DOCUMENTS

| | | | |
|---|---|---|---|
| 4,863,417 A * | 9/1989 | Kimata et al. ............. | 474/101 |
| 4,981,460 A * | 1/1991 | Ojima ...................... | 474/111 |
| 5,021,032 A * | 6/1991 | Macchiarulo et al. ....... | 474/138 |
| 5,713,809 A * | 2/1998 | Yamamoto et al. .......... | 474/110 |
| 5,879,255 A * | 3/1999 | Yamamoto et al. .......... | 474/110 |
| 5,935,031 A * | 8/1999 | Tada ........................ | 474/110 |
| 5,961,410 A * | 10/1999 | Yamamoto .................. | 474/110 |
| 6,146,300 A * | 11/2000 | Suzuki et al. ............... | 474/111 |
| 6,666,785 B1 * | 12/2003 | Namie et al. ............... | 474/109 |
| 2006/0172837 A1* | 8/2006 | Quintus et al. ............. | 474/135 |
| 2008/0194366 A1* | 8/2008 | Mevissen et al. ........... | 474/135 |

FOREIGN PATENT DOCUMENTS

JP 64-41756 3/1989

* cited by examiner

*Primary Examiner*—John Q Nguyen
*Assistant Examiner*—Robert T Reese
(74) *Attorney, Agent, or Firm*—Wenderoth, Lind & Ponack, LLP.

(57) ABSTRACT

A chain tensioner includes a housing having a closed bottom. A rod is axially movably inserted in the housing for pressing a chain. A wear ring is mounted to the outer periphery of the rod and is biased by a return spring mounted in the housing in a direction away from the bottom of the housing. A nut member is mounted between the wear ring and the bottom of the housing so as to be coaxial with the housing and axially movable relative to the housing. A ring-shaped spring member is provided between the nut member and the bottom of the housing to support the nut member. A screw rod is provided between the rod and the bottom of the housing and in threaded engagement with the nut member. A spring is provided between the screw rod and the bottom of the housing to bias the screw rod in a direction away from the bottom of the housing. The screw rod has an end surface that is in abutment with the rod.

16 Claims, 5 Drawing Sheets

CHAIN TENSIONER

BACKGROUND OF THE INVENTION

This invention relates to a chain tensioner mainly used to maintain tension of a timing chain for driving camshafts of an engine.

In a typical engine, the rotation of its crankshaft is transmitted to camshafts through a timing chain received in an engine cover to rotate the camshafts, thereby opening and closing valves mounted to combustion chambers. In order to keep the tension of the chain within a proper range, a tension adjusting device is typically used which comprises a chain guide pivotable about a shaft, and a chain tensioner for pressing the chain through the chain guide.

Among chain tensioners mounted in such tension adjusting devices, one as disclosed in JP utility model publication 64-41756 is known which includes a cylindrical housing having a closed bottom and having an internal thread formed on its inner periphery and in engagement with an external thread formed on the outer periphery of a rod for pressing the chain. A spring is disposed between the bottom of the housing and the rod to bias the rod away from the bottom of the housing.

When the tension of the chain changes while the engine is running, the rod repeatedly moves back and forth, while slowly rotating, within the range of the gap between the internal and external threads. The rod thus axially moves to a position where the biasing force of the spring balances with the tension of the chain.

When the engine is stopped, even if the tension of the chain is greater than the biasing force of the spring, because the chain does not vibrate, the rod neither rotates nor axially moves. Thus, when the engine is restarted, the chain is less likely to slacken, which permits a smooth restart of the engine.

But with this chain tensioner, because the rod does not rotate unless the chain is vibrating even when the tension of the chain increases, it is impossible to sufficiently reduce the tension of the chain if the engine resonates or fluctuations in torque of the crankshaft or rotational resistance of the camshafts per combustion cycle are large. Thus, the tension of the chain may increase excessively.

An object of the present invention is to provide a chain tensioner which can effectively reduce the tension of the chain while the engine is running.

SUMMARY OF THE INVENTION

In order to achieve this object, the present invention provides a chain tensioner comprising a housing having a closed bottom at one end thereof, a rod axially movably inserted in the housing for pressing a chain, a wear ring mounted to an outer periphery of the rod, a return spring mounted in the housing and biasing the wear ring in a direction away from the closed bottom of the housing, a nut member mounted in the housing between the wear ring and the closed bottom of the housing so as to be coaxial with the housing and axially movable relative to the housing, a ring-shaped spring member provided between the nut member and the closed bottom of the housing and supporting the nut member, a screw rod provided between the rod and the closed bottom of the housing and in threaded engagement with the nut member, and a spring provided between the screw rod and the closed bottom of the housing and biasing the screw rod in a direction away from the closed bottom of the housing, the screw rod having an end surface that is in abutment with the rod.

When the tension of the chain increases with the chain vibrating, the screw rod slowly rotates relative to the nut member while repeatedly moving back and forth within the range of the axial play between the screw rod and the nut member. The rod axially moves until the force of the return spring balances with the tension of the chain, thereby reducing the tension of the chain.

The tension of the chain may increase sharply due to resonance of the engine or sharp fluctuations in torque of the crankshafts or rotational resistance of the camshafts. In such a case, the spring member is compressed, so that the screw rod moves axially together with the nut member, thereby quickly reducing the tension of the chain.

When the engine is stopped, the tension of the chain may be higher than the force of the return spring. But once the engine stops, because the chain does not vibrate, the screw rod neither rotates nor moves axially.

Preferably, the chain tensioner further comprises a spring holder for retaining the spring member in an axially compressed state, with the nut member being supported by the spring member.

The spring holder may comprise a cylindrical portion in which the spring member is received, a bottom portion formed at one end of the cylindrical portion, and a radially inwardly extending flange formed at another end of the cylindrical portion by crimping, the spring member being axially sandwiched and held in position between the bottom portion and the radially inwardly extending flange.

Also, the chain tensioner may further comprise a stopper member provided between the nut member and the closed bottom of the housing for restricting the stroke of the nut member in a direction in which the spring member is compressed.

Further, the spring member may comprise at least two axially adjacent wave washers, and a flat washer disposed between the at least two axially adjacent wave washers.

With this chain tensioner, while the engine is running, when the tension of the chain increases, the screw rod slowly rotates relative to the nut member, thus reducing the tension of the chain. If the tension of the chain increases sharply, the wave washers are compressed, thus quickly reducing the tension of the chain. Thus, while the engine is running, the tension of the chain can be reduced effectively. The chain tensioner can thus prolong the lifespan of the chain.

By providing the spring holder for retaining the spring member in an axially compressed state, and supporting the nut member with the spring member, the spring member is not compressed until the tension of the chain exceeds the preload applied to the spring member by the spring holder. Thus, only if the tension of the chain increases sharply, the spring member is compressed, thereby quickly reducing the tension of the chain. While fluctuations in tension of the chain are small, the spring member is never compressed or expanded, so that the chain is less likely to vibrate.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
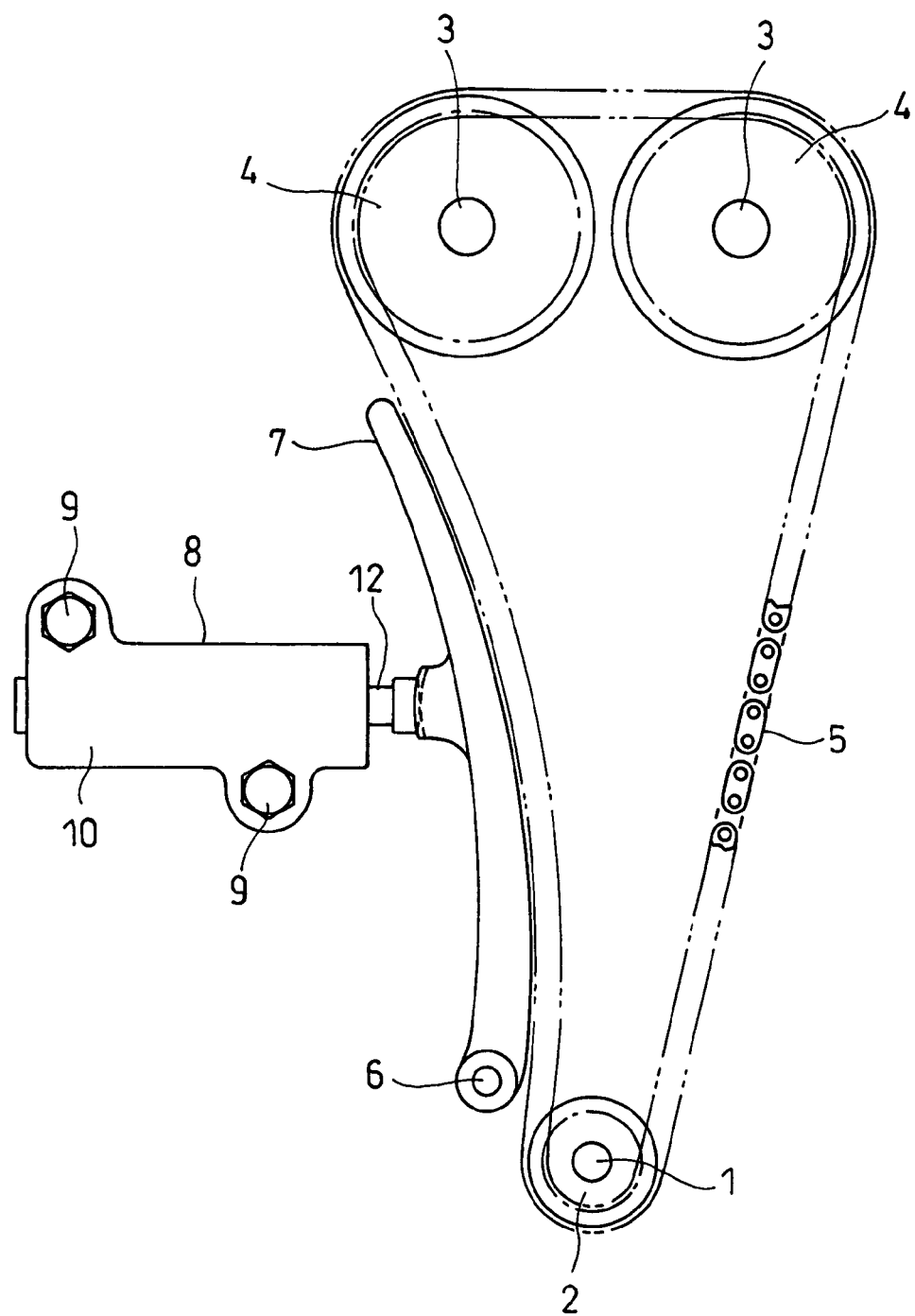
FIG. 1 is a front view of a chain transmission device including a chain tensioner according to a first embodiment of the present invention.

FIG. 1 shows a chain transmission mechanism including a chain tensioner according to the first embodiment of the present invention. This chain transmission mechanism further includes a sprocket 2 fixed to the crankshaft 1 of an engine, sprockets 4 each fixed to one of camshafts 3, and a chain 5 through which the sprockets 2 and 4 are coupled together. The rotation of the crankshaft 1 is transmitted to the camshafts 3, thereby rotating the camshafts 3. Thus, valves (not shown) in combustion chambers are repeatedly opened and closed.

A chain guide 7 pivotally supported on a shaft 6 fixed to an engine block (not shown) is in contact with the chain 5, and is pressed against the chain 5 by means of a chain tensioner 8.

Figure 2:
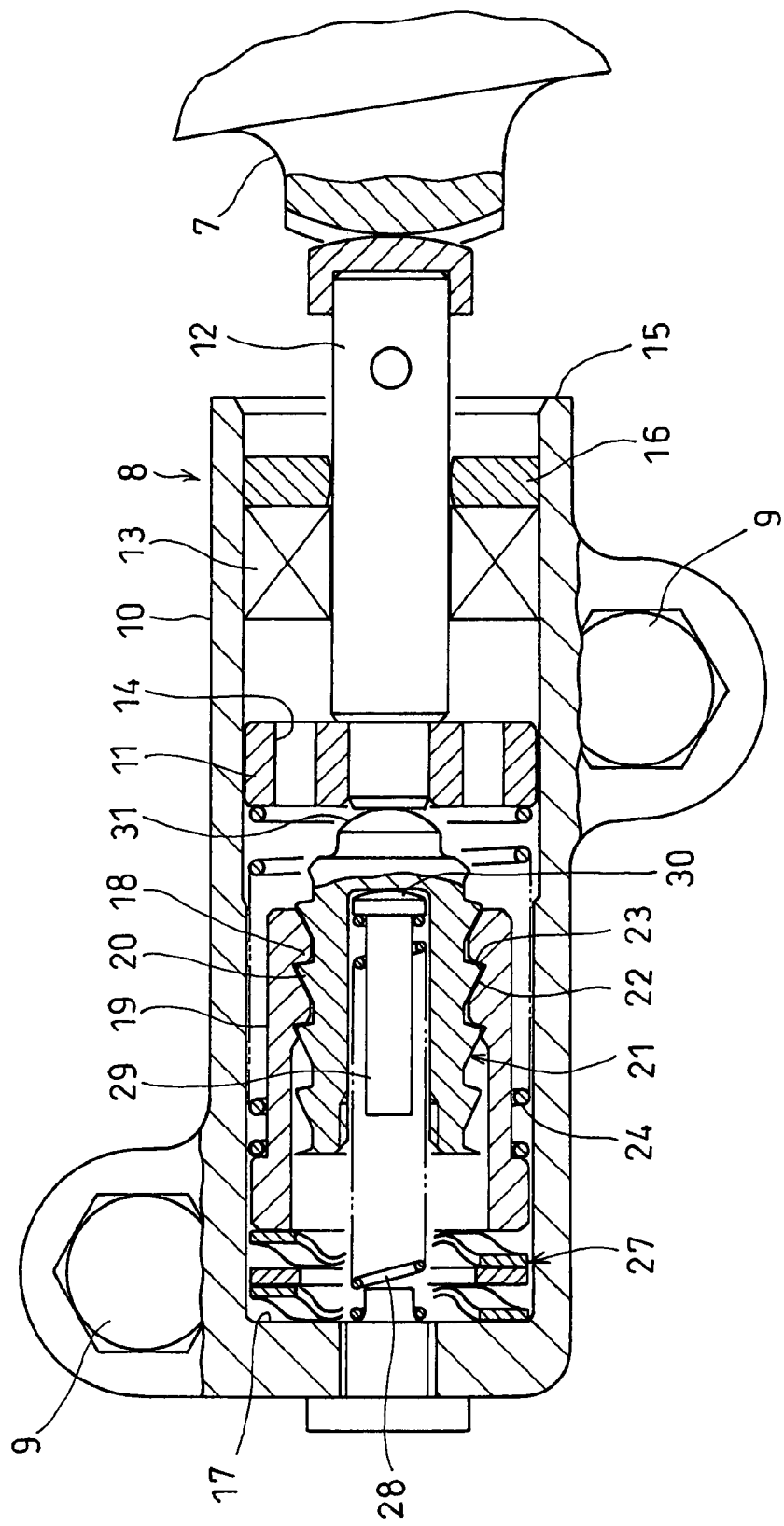
FIG. 2 is an enlarged sectional view of the chain tensioner shown in FIG. 1.

The chain tensioner 8 includes a housing 10 fixed to an engine block by means of bolts 9. As shown in FIG. 2, the housing has open and closed ends. In the housing 10, a slidable wear ring 11 is axially slidably mounted. The slidable wear ring 11 is fitted on a rod 12 mounted in the housing 10 so as to be coaxial with the housing 10. The wear ring 11 and the rod 12 are axially movable together with each other.

The housing 10 is filled with a suitable amount of hydraulic oil, which is hermetically sealed by a ring-shaped oil seal 13 through which the rod 12 slidably extends. The slidable wear ring 11 has oil passages 14 that axially extend therethrough and are circumferentially spaced from each other.

A stationary wear ring 16 is provided between the slidable wear ring 11 and the open end 15 of the housing 10. The rod 12 slidably extends through the stationary wear ring 16. The stationary wear ring 16 is pressed into and fixed to the housing 10, thereby supporting the outer periphery of the rod 12.

Between the slidable wear ring 11 and the bottom 17 of the housing 10, a nut member 19 is axially movably mounted so as to be coaxial with the housing 10. The nut member 19 has an internal thread 18 formed on its inner periphery which is in threaded engagement with an external thread 20 formed on the outer periphery of a screw rod 21.

The internal thread 18 and the external thread 20 are in threaded engagement with each other with an axial play therebetween. The internal and external threads 18 and 20 both have such an asymmetrical serration-shaped axial section that their pressure flanks 22, i.e. the flanks which support the pressure on the screw rod 21 that tends to move the screw rod 21 toward the bottom 17 of the housing, have a greater flank angle than their clearance flanks 23.

A return spring 24 is mounted in the housing 10 between the nut member 19 and the slidable wear ring 11. The return spring 24 biases the slidable wear ring 11 away from the bottom 17 of the housing 10.

Figure 3:
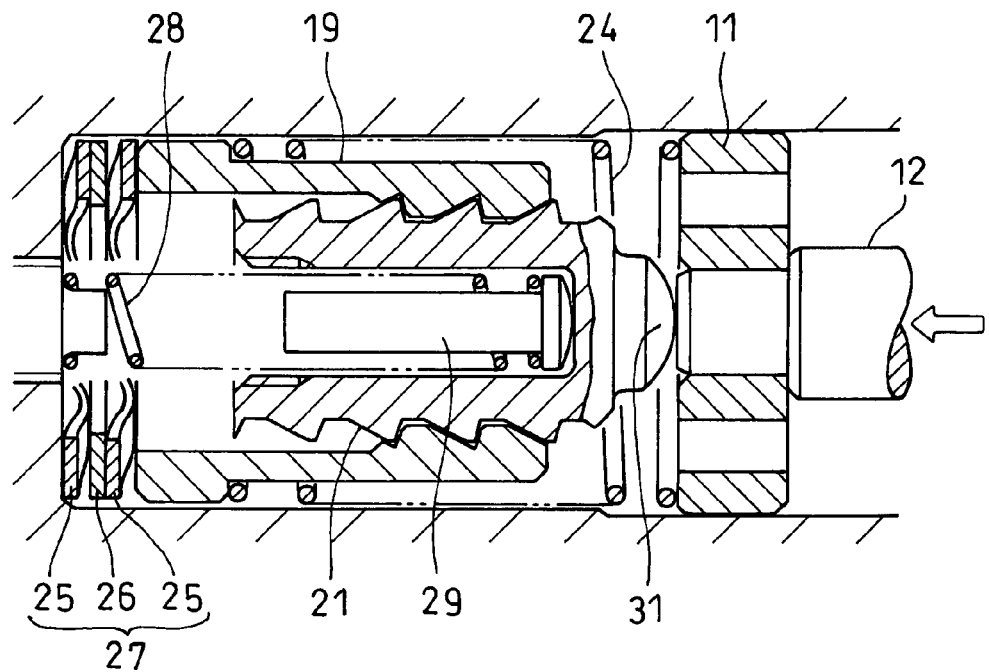
FIG. 3 is an enlarged sectional view of a portion of the chain tensioner of FIG. 2 where there is the nut member, showing its state in which wave washers are compressed.

Between the nut member 19 and the bottom 17 of the housing 10, a spring member 27 is mounted which comprises, as shown in FIG. 3, at least two axially adjacent ring-shaped wave washers 25 and a ring-shaped flat washer 26 disposed between the wave washers 25. The spring member 27 supports the axial end surface of the nut member 19.

Between the bottom 17 of the housing 10 and the screw rod 21, a spring seat 29 having a spherical end surface 30 facing the screw rod 21 is mounted, preferably within an axial bore formed in the screw rod 21 that opens through a first axial end of the screw rod 21 and has a closed bottom adjacent a second axial end of the screw rod 21. The spring seat 29 is biased by a spring 28 toward the screw rod 21 so that its spherical end surface 30 is pressed against the screw rod 21. As shown in FIG. 2, the spring is preferably disposed at least partially in the bore of the screw rod 21, is received at one end by the spring seat 29 and at the other end extends through the center opening of the spring member. The spring 28 thus biases the screw rod 21 through the spring seat 29 in a direction away from the bottom 17 of the housing 10. The screw rod 21 has a spherical end surface 31 which is in abutment with the rod 12.

The operation of the chain tensioner 8 is now described.

While the camshafts 3 are being driven, when the chain 5 vibrates and the tension of the chain 5 increases, the screw rod 21 slowly rotates relative to the nut member 19 while repeatedly moving back and forth within the range of the axial play between the internal and external threads 18 and 20. The rod 12 axially moves until the force of the return spring 24 balances with the tension of the chain 5, thereby reducing the tension of the chain 5.

The tension of the chain 5 may increase sharply due to resonance of the engine or sharp fluctuations in torque of the crankshafts 1 or rotational resistance of the camshafts 3. In such a case, the wave washers 25 of the spring member 27 are compressed as shown in FIG. 3, so that the screw rod 21 moves axially together with the nut member 19, thereby quickly reducing the tension of the chain 5.

When the tension of the chain 5 decreases, the rod 12 is moved away from the bottom 17 of the housing 10 by the return spring 24 until the force of the return spring 24 balances with the tension of the chain 5. When the rod 12 moves away from the bottom 17 of the housing by a distance greater than the axial play between the internal and external threads 18 and 20, the rod 12 momentarily separates from the end surface 31 of the screw rod 21. But soon thereafter, the screw rod 21 is moved axially, while rotating, toward the rod 12 under the force of the spring 28 until its end surface 31 abuts the rod 12 again.

When the engine is stopped, due to fluctuations in rotational resistance of the camshafts 3, the tension of the chain 5 may be higher than the force of the return spring 24. But once the engine stops, because the chain 5 does not vibrate, the screw rod 21 does not rotate relative to the nut member 19, so that the rod 12 does not move axially.

Because the screw rod 21 never rotates and thus never moves axially while the engine is stopped and the chain 5 does not vibrate, when the engine is restarted, the chain is less likely to slacken, which permits a smooth restart of the engine.

While the engine is running, when the tension of the chain 5 increases, the screw rod 21 slowly rotates relative to the nut member 19, thus reducing the tension of the chain 5. If the tension of the chain 5 increases sharply, the wave washers 25 are compressed, thus quickly reducing the tension of the chain 5. Thus, while the engine is running, the tension of the chain can be reduced effectively. The chain tensioner 8 thus serves to prolong the lifespan of the chain 5.

Because the screw rod 21 and the nut member 19 are both formed separately from the rod 12, and the end surface 31 of the screw rod 21 is in abutment with the rod 12, any force applied to the end of the rod 12 protruding from the housing 10 in a direction perpendicular to the axis of the rod 12 is less likely to be transmitted to the screw rod 21, so that the axes of the external and internal threads 18 and 19 are less likely to be displaced from each other. Thus, even if a force is applied to the end of the rod 12 protruding from the housing 10 in a direction perpendicular to the axis of the rod 12 (such a force is applied if e.g. the chain guide 7 pivots due to increased tension of the chain 5, so that the contact point between the chain guide 7 and the rod 12 moves), the screw rod 21 can smoothly rotate relative to the nut member 19 without encountering any major rotational resistance. This ensures stable operation of the chain tensioner 8.

Figure 4:
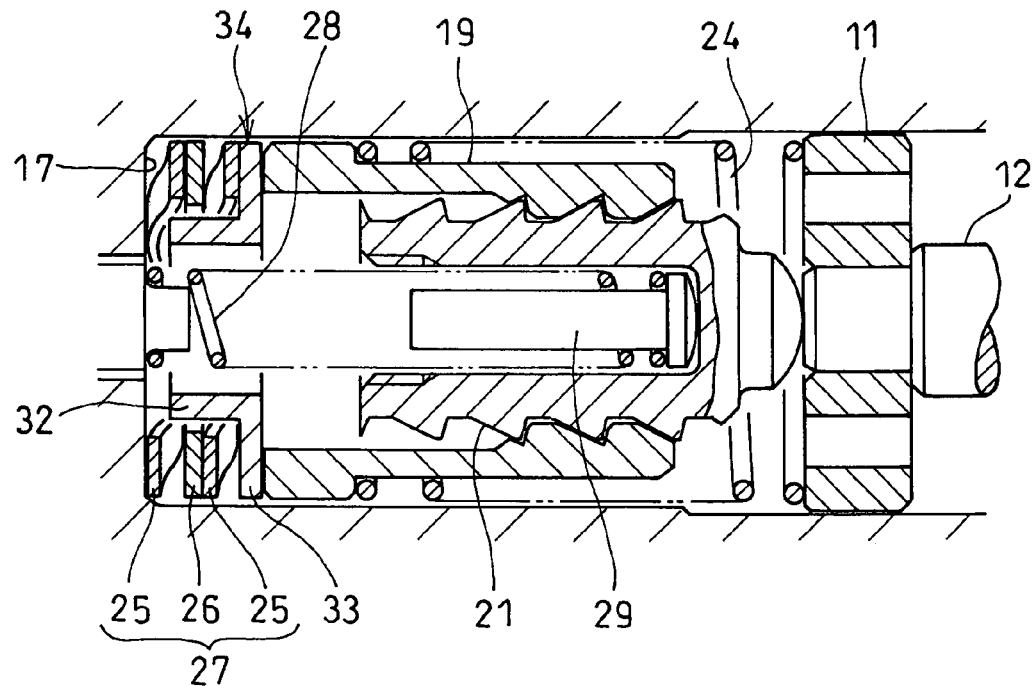
FIG. 4 is an enlarged sectional view of a chain tensioner including a stopper mounted between the wave washers and the nut member shown in FIG. 2, showing its portion where there is the nut member.

As shown in FIG. 4, the chain tensioner 8 may include a stopper member 34 comprising a cylindrical portion 32 and a flange 33 formed on the outer periphery of the cylindrical portion 32 and sandwiched between the spring member 27 and the nut member 19 so that the cylindrical portion 32 abuts the bottom 17 of the housing 10 when the spring member 27 is axially compressed. With this arrangement, it is possible to adjust the stroke of the nut member 19 in the direction in which the spring member 27 is compressed by changing the length of the cylindrical portion 32 of the stopper member 34.

In the embodiment, the spring member 27, which comprises the at least two axially adjacent wave washers 25 and the flat washer 26 disposed between the wave washers 25, is provided between the nut member 19 and the bottom 17 of the housing 10 in order to ensure a sufficient stroke of the nut member 19 when the spring member 27 is compressed. But instead of such a spring member 27, a single wave washer 25 may be provided between the nut member 19 and the bottom 17 of the housing 10.

Figure 5:
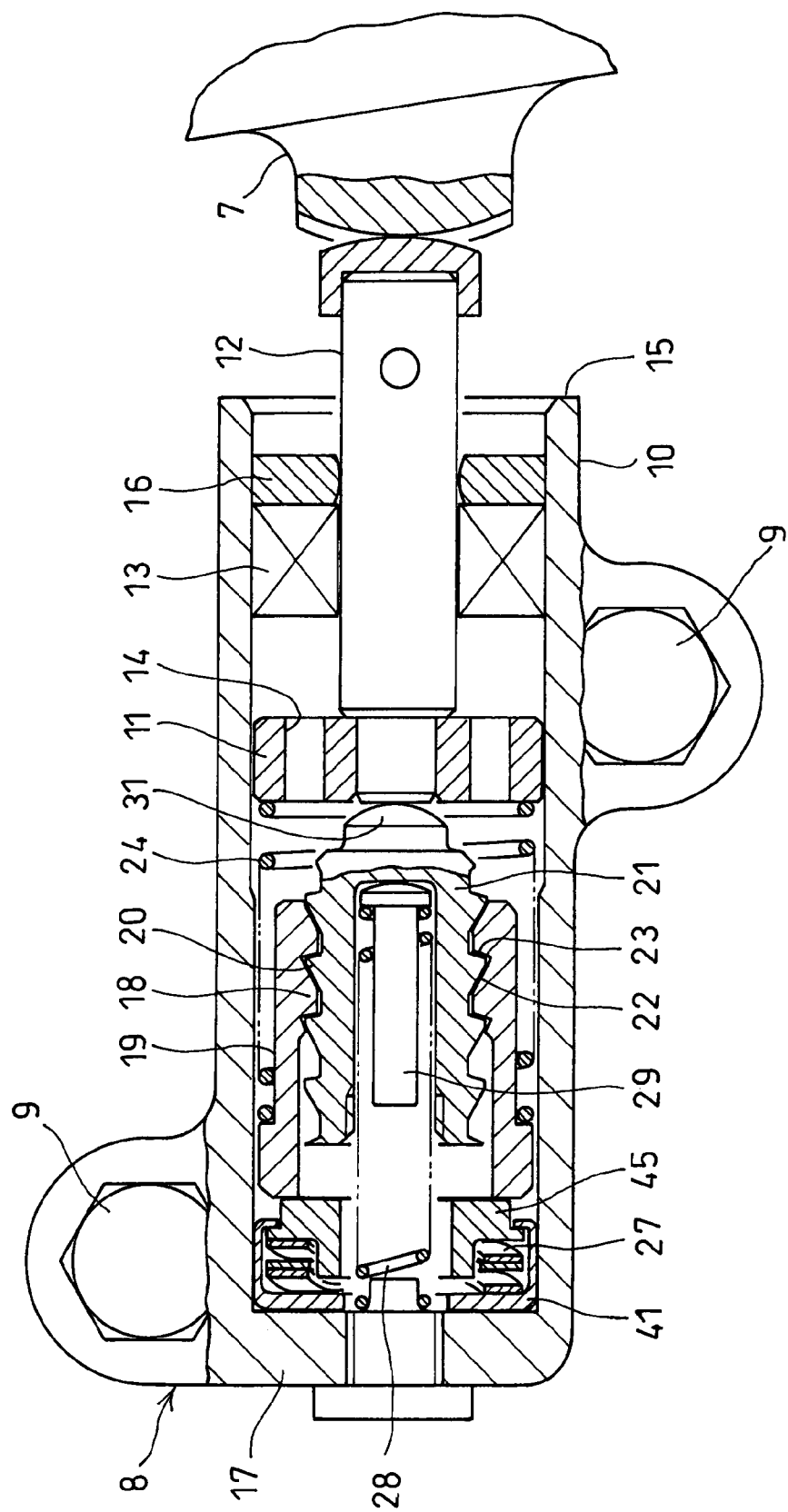
FIG. 5 is an enlarged sectional view of a chain tensioner according to a second embodiment of the present invention.
Figure 6:
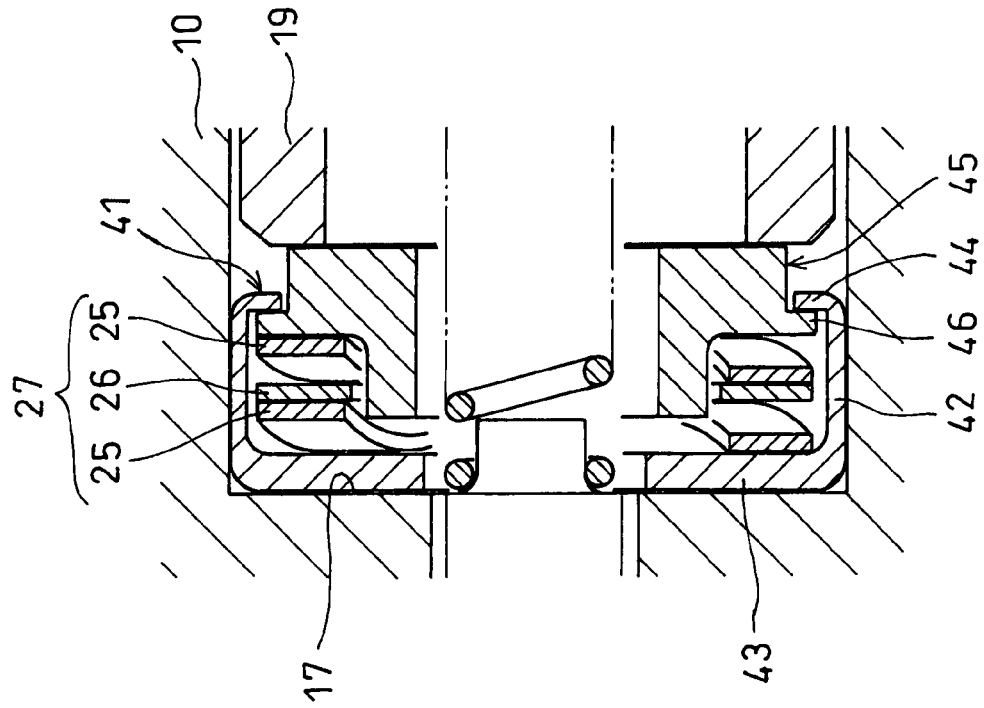
FIG. 6 is an enlarged view of a portion of the chain tensioner of FIG. 5 where there is the spring member.

FIGS. 5 and 6 show the chain tensioner 8 according to the second embodiment of the invention. Below, elements corresponding to those of the first embodiment are denoted by identical numerals, and their description is omitted.

Between the nut member 19 and the bottom 17 of the housing 10, a spring holder 41 is mounted for retaining the spring member 27 in an axially compressed state. The spring holder 41 comprises a cylindrical portion 42 in which the spring member 27 is received, a bottom portion 43 formed at one end of the cylindrical portion 42, and a radially inwardly extending flange 44 formed at the other end of the cylindrical portion 42 by crimping. The bottom portion 43 and the radially inwardly extending flange 44 axially sandwich the spring member 27, thereby applying a preload to the spring member 27.

Between the nut member 19 and the bottom 17 of the housing 10, a cylindrical stopper member 45 is provided which includes a flange 46 formed on the outer periphery thereof and sandwiched between the spring member 27 and the radially inwardly extending flange 44 of the spring holder 41. Thus, the nut member 19 is supported by the spring member 27 through the stopper member 45. When the nut member 19 is moved in the direction in which the spring member 27 is compressed, the stopper member 45 moves axially together with the nut member 19 until it abuts the bottom portion 43 of the spring holder 41, thereby limiting the stroke of the nut member 19.

In this embodiment, as with the first embodiment, when the tension of the chain 5 fluctuates, the rod 12 moves axially until the force of the return spring 24 balances with the tension of the chain 5, thereby reducing the tension of the chain 5.

Figure 7:
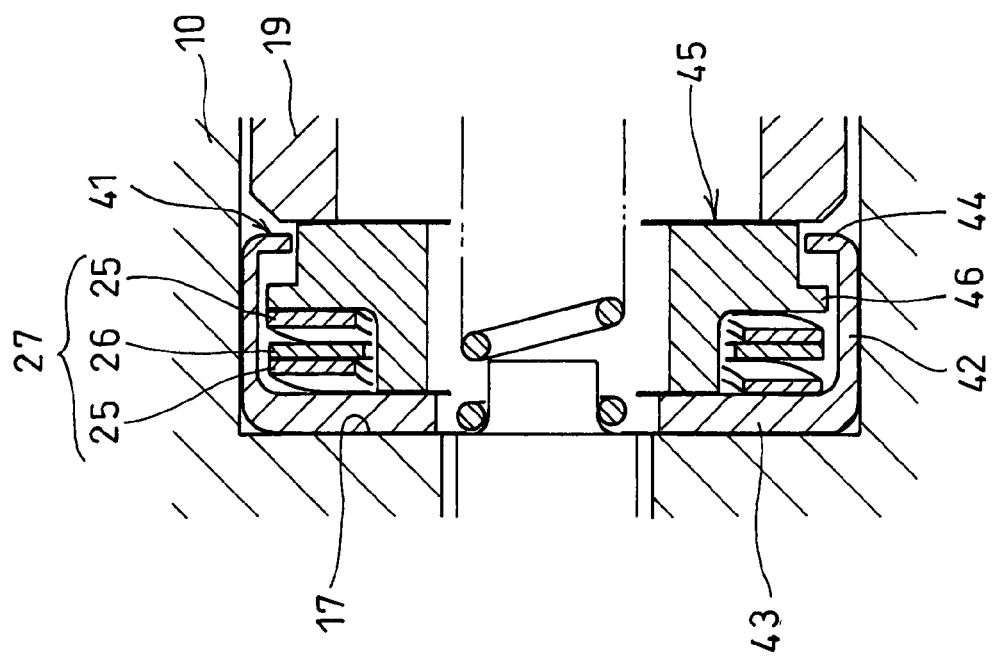
FIG. 7 is an enlarged sectional view similar to FIG. 6, showing a state in which the spring member is axially compressed.

The tension of the chain 5 may increase sharply due to resonance of the engine or sharp fluctuations in torque of the crankshafts or rotational resistance of the camshafts 3. In such a case, if the tension of the chain 5 exceeds the preload applied to the spring member 27 by the spring holder 41, as shown in FIG. 7, the stopper member 45 is moved axially in such a direction that its flange 46 separates from the radially inwardly extending flange 44 of the spring holder 41, while compressing the spring member 27. The screw rod 21 is thus also moved axially together with the nut member 19, so that the tension of the chain 5 is quickly reduced.

While the tension of the chain 5 while the engine is running is fluctuating within the range lower than the preload applied to the spring member 27 by the spring holder 41, the spring member 27 is not compressed.

In the first embodiment, because the spring member 27 supports the nut member 19 with no preload applied thereto, the spring member 27 can be compressed and expanded according to the tension of the chain 5 even while fluctuations in tension of the chain 5 is small. This may in turn cause vibration of the chain, thus producing noise. If, in an attempt to reduce such noise, a spring member having a greater spring constant is used, the tension of the chain 5 may not be sufficiently reduced while the engine is running if the tension of the chain increases sharply because the spring member 27 having such a large spring constant cannot be compressed sufficiently.

In the second embodiment, the spring member 27 is not compressed until the tension of the chain 5 exceeds the preload applied to the spring member 27 by the spring holder 41. Thus, only while fluctuations in tension of the chain are large, the spring member 27 is compressed, thereby quickly reducing the tension of the chain. While fluctuations in tension of the chain 5 are small, the spring member 27 is never compressed or expanded, so that the chain 5 is less likely to vibrate.

Also, by changing the axial length of the stopper member 45, it is possible to adjust the stroke of the nut member 19 in the direction in which the spring member 27 is compressed.

What is claimed is:

1. A chain tensioner comprising:
a housing having a closed bottom at one end thereof;
a rod axially movably inserted in said housing for pressing a chain;
a wear ring mounted to an outer periphery of said rod;
a return spring mounted in said housing and biasing said wear ring in a direction away from said closed bottom of said housing;
a nut member mounted in said housing between said wear ring and said closed bottom of said housing so as to be coaxial with said housing and axially movable relative to said housing;
a ring-shaped spring member provided between said nut member and said closed bottom of said housing and structured to receive any axial load applied to said nut member in a direction toward the closed bottom of the housing;
a screw rod provided between said rod and said closed bottom of said housing and in threaded engagement with said nut member; and
a spring provided between said screw rod and said closed bottom of said housing and biasing said screw rod in a direction away from said closed bottom of said housing;
said screw rod having an end surface that is in abutment with said rod.

2. The chain tensioner of claim 1 further comprising a spring holder for retaining said spring member in an axially compressed and preloaded state, said spring member being structured to receive any axial load applied to said nut member in a direction toward the closed bottom of the housing while being kept in the axially compressed and preloaded state by said spring holder.

3. The chain tensioner of claim 2 wherein said spring holder comprises a cylindrical portion in which said spring member is received, a bottom portion formed at one end of said cylindrical portion, and a radially inwardly extending flange formed at another end of said cylindrical portion by crimping, said spring member being axially sandwiched and held in position between said bottom portion and said radially inwardly extending flange.

4. The chain tensioner of claim 1 further comprising a stopper member provided between said nut member and said closed bottom of said housing for restricting the stroke of said nut member in a direction in which said spring member is compressed.

5. The chain tensioner of claim 2 further comprising a stopper member provided between said nut member and said closed bottom of said housing for restricting the stroke of said nut member in a direction in which said spring member is compressed.

6. The chain tensioner of claim 3 further comprising a stopper member provided between said nut member and said closed bottom of said housing for restricting the stroke of said nut member in a direction in which said spring member is compressed.

7. The chain tensioner of claim 1 wherein said spring member comprises at least two axially adjacent wave washers, and a flat washer disposed between said at least two axially adjacent wave washers.

8. The chain tensioner of claim 2 wherein said spring member comprises at least two axially adjacent wave washers, and a flat washer disposed between said at least two axially adjacent wave washers.

9. The chain tensioner of claim 3 wherein said spring member comprises at least two axially adjacent wave washers, and a flat washer disposed between said at least two axially adjacent wave washers.

10. The chain tensioner of claim 4 wherein said spring member comprises at least two axially adjacent wave washers, and a flat washer disposed between said at least two axially adjacent wave washers.

11. The chain tensioner of claim 5 wherein said spring member comprises at least two axially adjacent wave washers, and a flat washer disposed between said at least two axially adjacent wave washers.

12. The chain tensioner of claim 6 wherein said spring member comprises at least two axially adjacent wave washers, and a flat washer disposed between said at least two axially adjacent wave washers.

13. The chain tensioner of claim 1 wherein
said screw rod has first and second axial ends, said first axial end being closer than said second axial end to said closed bottom of said housing;
an axial bore is formed in said screw rod, said axial bore opening through said first axial end of said screw rod and having a bottom adjacent said second axial end of said screw rod; and
said spring extends into and is seated within said axial bore of said screw rod.

14. The chain tensioner of claim 13, further comprising a spring seat movably disposed in said axial bore of said screw rod and receiving said spring.

15. The chain tensioner of claim 14 wherein said ring-shaped spring member has a center opening therethrough, and said spring extends at least partially through said center opening of said spring member.

16. The chain tensioner of claim 15 wherein said spring member comprises at least two axially adjacent wave washers, and a flat washer disposed between said at least two axially adjacent wave washers.

* * * * *